United States Patent [19]
Brule et al.

[11] Patent Number: 5,097,600
[45] Date of Patent: Mar. 24, 1992

[54] SUPPORT DEVICE, ESPECIALLY FOR EYEGLASS FRAMES

[75] Inventors: Francois Brule, Champigny/Marne; Jean-Pierre Cuvilly, Viels Maisons, both of France

[73] Assignee: Essilor International Cie Generale d'Optique, Creteil Cedex, France

[21] Appl. No.: 448,633

[22] Filed: Dec. 11, 1989

[30] Foreign Application Priority Data

Dec. 21, 1988 [FR] France ................. 88 16911

[51] Int. Cl.⁵ .............................................. B25B 1/06
[52] U.S. Cl. ............................................ 33/28; 33/507; 33/200; 269/156
[58] Field of Search .............. 33/28, 507, 200, 513, 33/568, 569, 570; 356/127, 125; 269/156, 71

[56] References Cited

U.S. PATENT DOCUMENTS

| | | | |
|---|---|---|---|
| 2,878,567 | 3/1959 | Hofman et al. | 33/28 |
| 3,605,241 | 9/1971 | Fisk | 29/208 |
| 3,617,046 | 11/1971 | Sotonyi | 269/156 |
| 4,049,254 | 9/1977 | Godot | 269/156 |
| 4,098,002 | 7/1978 | Campbell et al. | 33/507 |
| 4,571,842 | 2/1986 | Ikezawa et al. | 356/127 |
| 4,625,418 | 12/1986 | Joncour et al. | 33/507 |
| 4,724,617 | 2/1988 | Logan et al. | 33/28 |

FOREIGN PATENT DOCUMENTS

| | | |
|---|---|---|
| 0190450 | 8/1986 | European Pat. Off. ........ 33/507 |
| 2016988 | 5/1970 | France . |
| 2124265 | 9/1972 | France . |
| 2319076 | 2/1977 | France . |
| 1371247 | 10/1974 | United Kingdom . |

Primary Examiner—Thomas B. Will
Attorney, Agent, or Firm—Longacre & White

[57] ABSTRACT

A support device for eyeglass frames whereby the contour of one or both rims or surrounds of the frame can be read comprises a plurality of retaining means on a plate and on a flap pivoted to the plate. The retaining means are adapted to hold an eyeglass frame above a hole in the plate. The flap is pivoted to the plate and its inclination relative to the plate is adjustable.

26 Claims, 3 Drawing Sheets

SUPPORT DEVICE, ESPECIALLY FOR EYEGLASS FRAMES

BACKGROUND OF THE INVENTION

1. Field of the Invention

The present invention is generally concerned with a support device to which any kind of object can be fixed temporarily, for example a device of the type usually associated with a contour reading device for securing an object whose contour or part of whose contour is to be read relative to the follower of the contour reading device.

It is more particularly directed to the case where the object concerned is an eyeglass frame and the contour of the rims or surrounds of the frame is to be read for the purpose of trimming the lenses to be mounted in the frame.

2. Description of the Prior Art

Eyeglass frame support devices usually comprise, disposed on a plate, a plurality of retaining means adapted to support an eyeglass frame over a hole or cavity in the plate.

This is the case, for example, with the support devices that are the subject matter of French patents Nos. 2 016 998, 2 124 265 and 2 319 076.

In the case of a contour reading device, the follower operates through the hole or cavity in the plate.

Usually consisting of pistons or slide members, the retaining means employed in these support devices in practise operate in specific radial directions.

This entails individual manipulation of each retaining means and their overall use is therefore relatively difficult and time consuming.

What is more, if the corresponding manipulation is not executed correctly it may lead to distortion of the eyeglass frame so that the subsequent contour reading is falsified.

It is therefore difficult with a support device kind to allow for the often pronounced curvature or meniscus-like shape of the rims or surrounds of the eyeglass frame.

However, this curvature can affect the inclination of the rim or surround when its contour is read.

Assuming that the eyeglass frame as a whole is laid flat, the "inclination" of a rim or surround means in this context the angle of the mean plane of the rim or surround to a reference plane passing through the median axis of symmetry of the frame.

It is clear that, depending on this inclination, the perimeter as read is different to a greater or lesser degree from the actual perimeter of the rim or surround concerned, the parameter read being that of the corresponding projection cylinder.

In practice, the greater the inclination of an eyeglass frame rim or surround on a support device the smaller the perimeter that is read.

There is therefore the risk that the lens trimmed according to this reading could be too small for the rim or surround to which it is to be fitted so that it could inadvertently fall out of the latter.

To avoid this risk the usual practice is to increase systematically the results of the reading obtained so that the trimmed lens is definitely too large for the rim or surround concerned, the lens being then "retouched" to fit it to the frame.

However, the retouching operation inevitably wastes considerable time.

What is more, the results can only be somewhat imperfect.

A general object of the present invention is a support device, especially one for eyeglass frames, that is free of these disadvantages and has additional advantages.

SUMMARY OF THE INVENTION

The present invention consists in a support device for eyeglass frames comprising a plate, a hole in the plate, a flap pivoted to the plate and adjustable in terms of its inclination relative to the plate and a plurality of retaining means on the plate and the flap adapted to hold an object above the hole.

The inclination adjustment is in practise carried out after centering the eyeglass frame and adjusting its orientation relative to an axis perpendicular to that to which the inclination adjustment relates. By virtue of this inclination adjustment it is advantageously possible to optimize the reading of the contour by ensuring that the projection cylinder of the rim or surround concerned has the largest possible perimeter so that the read perimeter will be as close as possible to the actual perimeter of the rim or surround.

The advantage of this is that the corresponding lens is trimmed directly to the dimensions of the rim or surround.

The retaining means preferably comprise a centering finger and various orientation abutment members on both sides of the hole in the plate, and each of these orientation abutment members preferably comprises an inclined surface which converges towards the corresponding side of this hole at the same time as it diverges upwardly therefrom and a retaining plate above and substantially parallel to the hole towards which the inclined surface faces.

The retaining means employed in accordance with the invention therefore offer a reference support to the rear surface of the eyeglass frame concerned, through the intermediary of the plate retaining these orientation abutment means, this support also orienting the eyeglass frame.

In this way the securing of the eyeglass frame while its contour is read is advantageously unaffected by any projections that may be present on its front surface, for decorative purposes, for example.

In a preferred embodiment of the invention the centering finger, which is carried by the flap, is slidable parallel to the pivot axis of the flap, an auxiliary finger carrying at its free end an orientation abutment member is slidable on the flap parallel to the centering finger, the centering finger and the auxiliary finger each carry a respective rack meshing with a common pinion disposed between them and freely rotatable on a slide operable by the operator, the slide is movable parallel to the pivot axis of the flap between a retracted standby position and a deployed service position, there are provided between the slide in the retracted standby position and the flap releasable snap-fastener means adapted to retain the slide selectively in the retracted standby position, the centering finger and the auxiliary finger being acted on by spring means urging each of them at all times towards the opposite side of the hole in the plate, the spring means acting on the centering finger being stronger than the spring means acting on the auxiliary finger.

The other orientation abutment members are fixed, at least while they are operative.

The operations that an operator has to carry out to fix an eyeglass frame to the support device in accordance with the invention are thereby reduced: all that is necessary is to move the slide to the retracted standby position, to place the eyeglass frame on the opposed fixed orientation abutment members and to release the slide.

The support device in accordance with the invention is therefore particularly quick and secure to use.

What is more, there is then an advantageous separation between the eyeglass frame centering and orientation adjustment functions, this separation having the advantage of allowing the centering to be done before the orientation adjustment and therefore before the inclination adjustment that is applied afterwards.

The support device in accordance with the invention preferably comprises two ajoining flaps adapted to pivot about parallel axes, one for reading the contour of the lefthand rim or surround of the eyeglass frame and the other for reading the contour of its righthand rim or surround.

Thus the operations to be carried out to go from one of these readings to the other are advantageously reduced.

The support device in accordance with the invention preferably comprises an auxiliary support movable between a retracted position away from the hole in the plate and a deployed position in which is overlies this hole.

It is therefore possible with the support device in accordance with the invention to read the contour of a template, for example, or that of a lens that has already been trimmed, appropriately attached to the auxiliary support, instead of reading the contour of the corresponding rim or surround of the eyeglass frame to be fitted with the lenses.

In practise, the orientation abutment member opposite the auxiliary finger, assumed to be fixed, is common to the two flaps that the support device in accordance with the invention may preferably comprise, the auxiliary support being disposed on the same side of the hole in the plate of the latter as this orientation abutment member, which is itself movable between a retracted position away from the hole in the plate and a deployed position overlying this hole, the auxiliary support and the orientation abutment member having common control means that can be operated by the operator and such that one is in the retracted position when the other is in the deployed position and vice versa.

The support device in accordance with the invention therefore has the advantage of being systematically ready for reading the contour of an eyeglass frame rim or surround or for reading the contour of a template or a previously trimmed lens.

The characteristics and advantages of the invention will emerge from the following description given by way of example with reference to the appended diagrammatic drawings.

DETAILED DESCRIPTION OF THE INVENTION

The figures show by way of example the application of the invention to the temporary securing of an eyeglass frame 10, schematically shown in chain-dotted outline, with its rims or surrounds 11, 11', central bridge 12 and lateral temples 13, 13', relative to a contour reading device (not shown).

The support device 15 used for this purpose comprises, in a way that is known in itself, and disposed on plate 16 in a way to be described in more detail later, a plurality of retaining means 18 also to be described in more detail later and adapted to hold the eyeglass frame 10 above a hole 19 in the plate 16.

In practise only one of the rims or surrounds 11, 11' of the eyeglass frame 10 then lies above the hole 19, its righthand rim or surround 11 as shown here.

According to the invention, some at least of the retaining means 18 are carried by a flap 20 pivoted to the plate 16 and the inclination which is adjustable.

Figure 1:
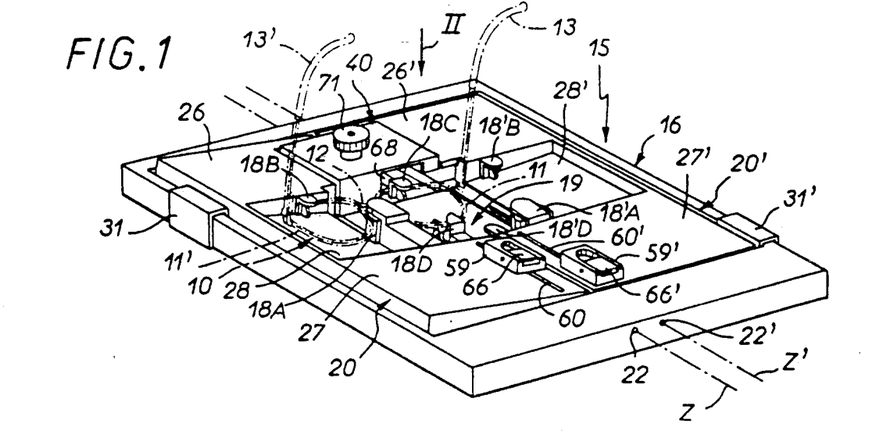
FIG. 1 is a perspective view of a support device in accordance with the invention.
Figure 2:
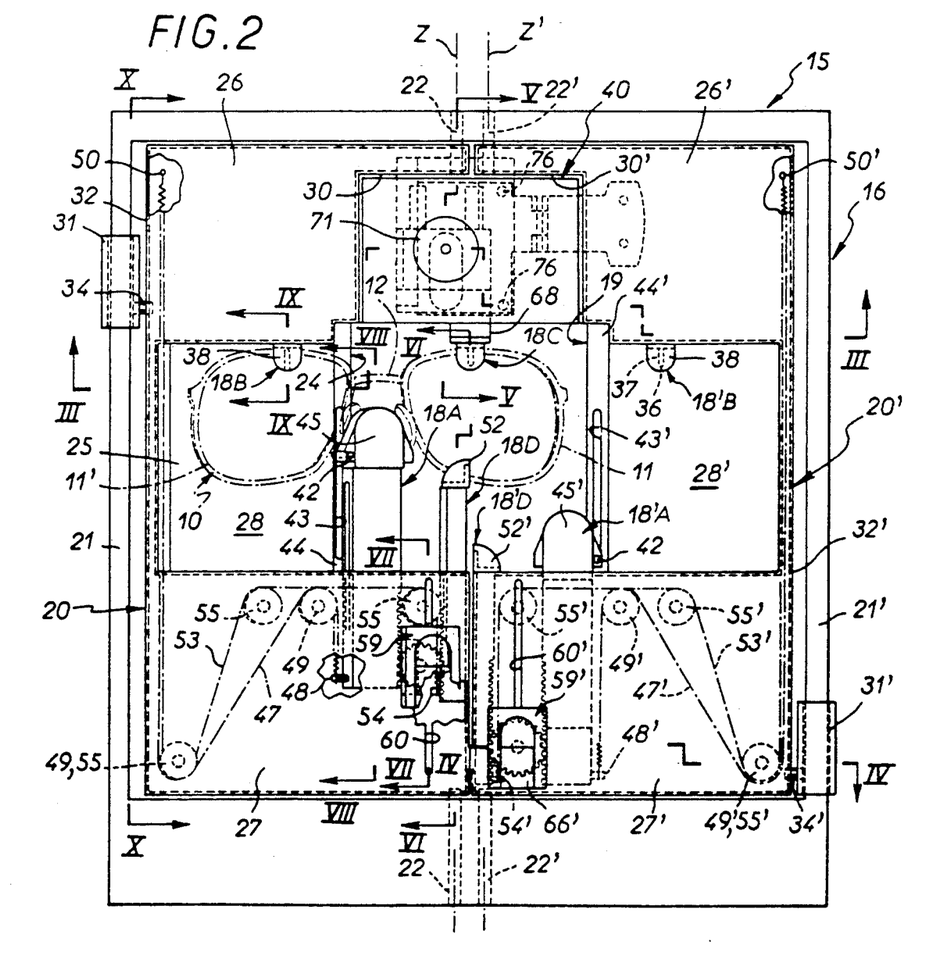
FIG. 2 is a plan view of it as seen in the direction of the arrow II in FIG. 1.

The pivot axis Z of the flap 20 is schematically represented in chain-dotted line in FIGS. 1 and 2.

This support device 15 in accordance with the invention comprises two flaps 20, 20' disposed side by side, one on the left for reading the contour of the righthand rim or surround 11 of the eyeglass frame 10 and the other on the right for reading the contour of the lefthand rim or surround 11'. They pivot about respective parallel axes Z, Z'.

The plate 16 of the support device 15 constitutes a frame with a generally rectangular contour entirely filled by the flaps 20, 20'.

The pivot axes Z, Z' of the flaps 20, 20' are parallel to two opposite sides 21, 21' of the frame and they are materially represented by journals 22, 22' operative between the flaps 20, 20' and the central area of its other two sides.

As the two flaps 20, 20' are identical only one of them (the flap 20) will be described in detail.

The flap 20 has a notch 24 in its middle part on the same side as its pivot axis Z, defining part of the hole 19 in the plate 16. Its overall configuration is therefore C-shaped.

The middle part 25 of the corresponding C-shape is set back relative to bars 26, 27 on either side of it and has an inclined surface 28 facing towards the opening 19 in the plate 16.

The bars 26, 27 are at the same level relative to the set back middle part 25.

For reasons that will emerge hereinafter, the bar 26 has a notch 30 in it on the same side as the pivot axis Z, continuous with the notch 24 defining part of the hole 19 in the plate 16.

The journals 22 are engaged with the bars 26, 27.

On the side 21 of the frame constituting the plate 16 parallel to the pivot axis Z of the flap 20 is a mobile slider 31 and to enable the inclination of the flap 20 to be adjusted cam means are provided between the slider 31 and the corresponding edge 32 of the flap 20.

Figure 10:
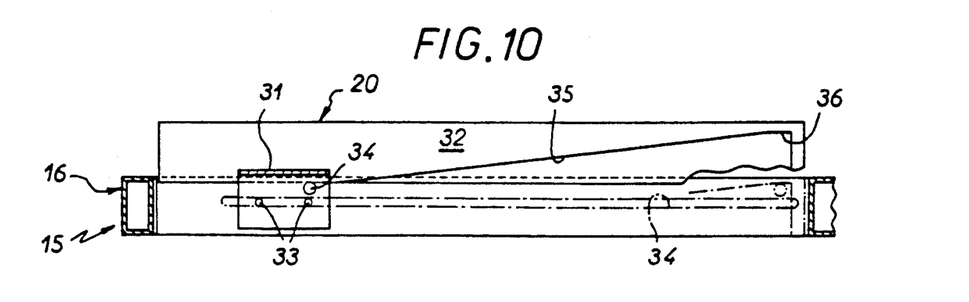

The slider 31 straddles the side 21 of the frame constituting the plate 16. Projecting from the inside surface of one of its two legs are two pegs 33 (see FIG. 10) which are inserted into a groove 34 provided for this purpose on the corresponding outside surface of said side 21 of the frame, to guide the slider 31.

The cam means provided between the slider 31 and the edge 32 of the flap 20 comprise a peg 34 on the slider 31 projecting towards the flap 20 and a ramp surface 35 on the corresponding edge 32 of the flap 20 through which the flap 20 bears on the peg 34.

The ramp 35 is recessed relative to the edge 32 of the flap 20 and extends generally obliquely from the lower surface of this edge 32 to a facet 36 in the immediate vicinity of its upper surface.

Figure 3:
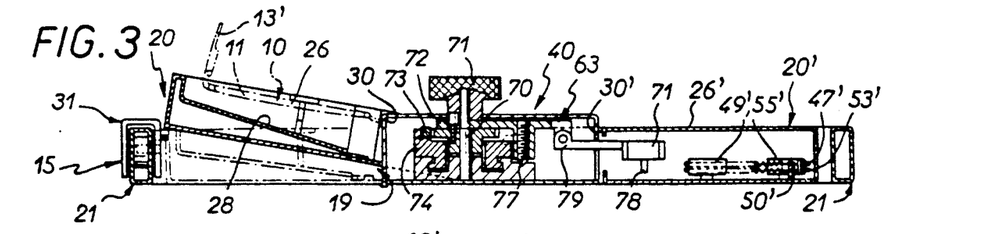
FIGS. 3 through 10 are, in some cases partially cut away, views in cross-section on the respective lines II—II, III—III, IV—IV, V—V, VI—VI, VII—VII, VIII—VIII, IX—IX and X—X in FIG. 2.
Figure 4:
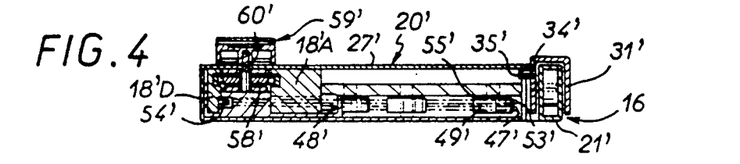
Figure 5:
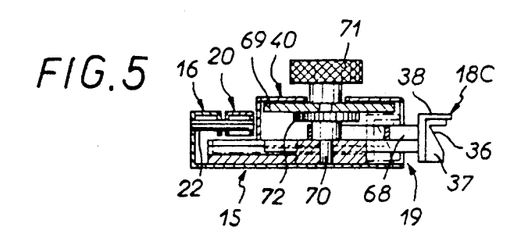
Figure 6:
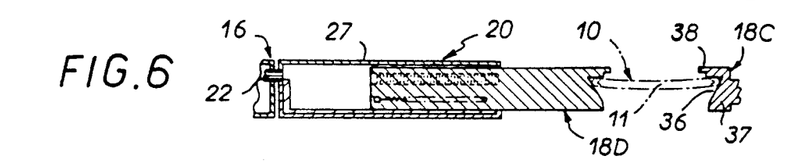

As shown in FIG. 3, and as will be readily understood, by moving the slider 31 along the side 21 of the frame constituting the plate 16 it is possible to pivot the flap 20 from a flat position in which (as shown in chain-dotted line in FIG. 3) it is retracted within the frame, level with the latter, to an inclined position in which (as shown in full line) it projects out of the frame, extending obliquely towards the hole 19 in the plate 16.

As already mentioned, the flap 20' is of identical construction.

To simplify the description it will not be described again.

However, in the figures components that are the same as components already described are assigned the same but primed reference numbers.

The hole 19 in the plate 16 has a generally rectangular contour with sides parallel to those of the frame constituting the plate 16.

Two of these sides are therefore parallel to the pivot axes Z, Z' and the other two perpendicular to these.

As will be described in more detail later, the retaining means 18 for each flap 20, 20' comprise a centering finger 18A, 18'A perpendicular to the pivot axes Z, Z' carried by the flap 20, 20' and lying on a first side of the hole 19 in the plate 16. This finger slides parallel to the pivot axis Z, Z', at a distance from this pivot axis Z, Z', and is adapted to operate on the eyeglass frame 10 in its plane of symmetry between its two rims or surrounds 11, 11', preferably away from any nose pads. The holding means 18 further comprise, on the opposite side of the hole 19 in the plate 16, an orientation abutment member 18B, 18'B also carried by said flap 20, 20'.

The orientation abutment member 18B, 18'B is fixed and offset relative to the corresponding centering finger 18A, 18'A, extending beyond the centering finger 18A, 18'A relative to the pivot axis Z, Z' of the flap 20, 20' concerned.

Figure 9:
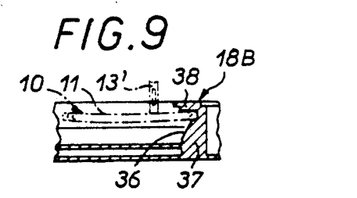

Backing onto the flank of the bar 26, 26' of the flap 20, 20', an orientation abutment member 18B, 18'B has (see FIG. 9) an inclined surface 36, 36' formed by the edge of a rib 37, 37' perpendicular to this flank and converging towards the corresponding side of the hole 19 in the plate 16 at the same time as it diverges upwardly from the hole 19 and, substantially parallel to and above said hole 19, a plate 38, 38' towards which the previously mentioned inclined surface 36, 36' faces.

The retaining means 18 further comprise a second orientation abutment member 18C on the same side of the hole 19 in the plate 16 as the previously described orientation abutment member 18B, 18'B, in the immediate vicinity of the pivot axis Z, Z' of the flap 20, 20'.

For reasons that will emerge hereinafter, the second orientation abutment member 18C is common to the two flaps 20, 20' and located exactly on the axis of the plate 16 between the pivot axes Z, Z' of the flaps 20, 20'. It is supported, in a way to be described in more detail later, by a fixed casing 40 fastened to the plate 16 and located in the notch 30, 30' of the bar 26, 26' of the flaps 20, 20'.

The second orientation abutment member 18C is the only part of the retaining means 18 that is not carried by a flap 20, 20'.

The second orientation abutment member 18C is similar in construction to the previously described orientation abutment members 18B, 18'B, having an inclined surface 36 formed by the edge of a rib 37 and a retaining plate 38.

The orientation abutment members 18B, 18'B, 18C are substantially aligned perpendicularly to the pivot axes Z, Z' of the flaps 20, 20' and for the flat position of the latter their retaining plates 38 are all coplanar.

The orientation abutment members 18B, 18C are substantially symmetrical to each other relative to the corresponding centering finger 18A and similarly the orientation abutment members 18'B, 18'C are substantially symmetrical to each other relative to the centering finger 18'A.

Each centering finger 18A, 18'A slides in the bar 27, 27' of the corresponding flap 20, 20' and is guided by a peg 42, 42' on it inserted in a groove 43, 43' provided to this end on a tang 44, 44' extending the corresponding inclined surface 28, 28' of the flap 20, 20' on the same side as the hole 19 in the plate 16.

The centering finger 18A, 18'A has a rounded nosepiece 45, 45' at its free end to bear on the eyeglass frame 10.

It is acted on by spring means which urge it at all times towards the opposite side of the hole 19 in the plate 16, in other words towards the associated orientation abutment members 18B, 18'B.

The spring means comprise a spring 47, 47' which is very long so that the force it applies is substantially constant. One end is attached to a peg 48, 48' fastened to the centering finger 18A, 18'A. It passes over a number of direction-changing pulley wheels 49, 49' and its other end is attached to a fixed peg 50, 50' on the side of the bar 26, 26' opposite the flap 20, 20' in question.

The retaining means 18 that the support device 15 incorporates further comprise an auxiliary finger 18D, 18'D parallel to the centering finger 18, 18'A and on the same side of the hole 19 in the plate 16 as the centering finger 18, 18'A. It slides in the bar 27, 27' of the corresponding flap 20, 20' and carries an orientation abutment member 52, 52' at its free end which bears on the eyeglass frame 10.

The orientation abutment members 52, 52' have the same structure as the previously described orientation abutment members 18B, 18'B, 18C with an inclined surface 36 forming the edge of a rib 37 and a retaining plate 38, but the retaining plate 38 and the flange from which the rib 37 projects is less than half as long and is coplanar with them.

The auxiliary finger 18D, 18'D extends along the pivot axis Z, Z' of the corresponding flap 20, 20' in line with the journals 22, 22'.

Like the associated centering finger 18A, 18'A it is acted on by spring means which urge it at all times towards the opposite side of the hole 19 in the plate 16 and therefore towards the orientation abutment member 18C.

For the same reason as applies to the centering finger 18A, 18'A, the spring means comprise a long spring 53, 53' attached at one end to a peg 54, 54' fastened to the auxiliary finger 18D, 18'D in question. The spring passes around a number of direction-changing pulley wheels 55, 55', some of which are coaxial with direction-changing pulley wheels 49, 49' of the spring 47, 47' associated with the centering finger 18A, 18'A. Its other end is attached to the peg 50, 50' to which the spring 47, 47' is also attached, on the same side as the bar 26, 26' of the flap 20, 20'.

Figure 11:
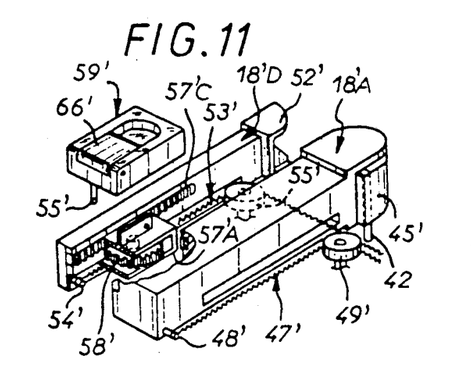
FIG. 11 is a partially cut away partial exploded perspective view of some component parts of the support device, drawn to a different scale.

As is more clearly seen is respect of the centering finger 18'A and the auxiliary finger 18'D in FIG. 11, each centering finger 18A, 18'A and the associated auxiliary finger 18D, 18'D carries a respective rack 57A, 57'A, 57D, 57'D. These racks mesh with a common pinion 58, 58' disposed between them and freely rotatable on a slide 59, 59' accessible to the operator.

The slide 59, 59' is movable parallel to the retracted standby position, which is the position shown in FIG. 1 for the slide 59', and a deployed service position, which is the position shown in FIG. 1 for the slide 59.

Each slide 59, 59' is guided by a central flange which passes through a slot 60, 60' provided for this purpose in the upper wall of the bar 27, 27' of the corresponding flap 20, 20'.

In the retracted standby position of the slide 59, 59' there lie between the slide 59, 59' and the corresponding flap 20, 20' releasable snap-fastener means adapted to retain selectively the slide 59, 59' in the retracted standby position.

Figure 7:
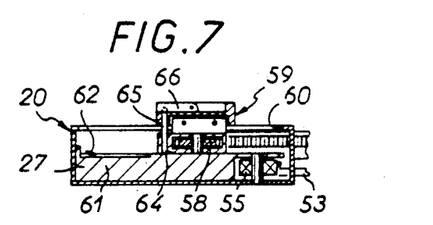
Figure 8:
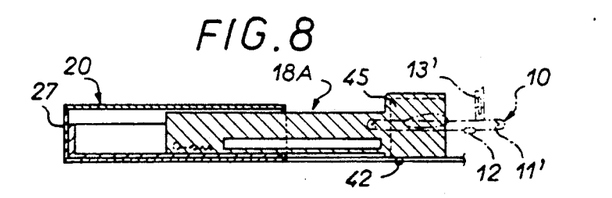

The releasable snap-fastener means for each slide 59, 59' comprise, as can be seen in FIG. 7 in the case of the slide 59 only, an elastically deformable tang 62 carried by the base 61 on which the slide 59, 59' is movably mounted. It projects from the base 61 and is designed to cooperate retention-wise with a notch 64 in the slide 59, 59'.

For releasing it, each slide 59, 59' includes a rod 65, 65' sliding transversely through the slide 59, 59' over the full height thereof and movable perpendicularly to the corresponding base 61 to operate on the elastically deformable tang 62. It is controlled by a tab 66, 66' pivoted to the surface of the slide 59, 59'.

The spring 47 constituting the spring means acting on the centering finger 18A, 18'A is stronger than the spring 53 constituting the spring means acting on the associated auxiliary finger 18D, 18'D.

All that the operator has to do to hold the righthand (for example) rim or surround 11 of the eyeglass frame 10 in line with the hole 19 in the plate 16 is initially to move back the slide 59 of the flap 20 until the elastically deformable tang 62 associated with the slide 59 engages the notch 64 thereon, so locking the slide 59 temporarily into the retracted standby position.

On moving towards this retracted standby position the slide 59 entrains with it the centering finger 18A and the auxiliary finger 18D, by means of its pinion 58 and against the springs 47, 53 constituting the spring means acting on them.

When the slide 59 is locked in the retracted standby position it holds the centering finger 18A and the auxiliary finger 18D in the retracted standby position, providing room to fit the eyeglass frame 10.

The second step is to fit the eyeglass frame 10 by placing the front part of its rims or surrounds 11, 11' in contact with the orientation abutment members 18B, 18C with the rims or surrounds 11, 11' engaged between the inclined surface 36 and the retaining plate 38 of the orientation abutment members 18B, 18C.

The third step is for the operator to release the slide 59 by pressing its tab 66.

The assembly comprising the slide 59, the centering finger 18A and the auxiliary finger 18D is then acted on by the springs 47 and 53 acting on the latter fingers.

However, because the spring 47 is stronger, initially only the centering finger 18A moves, followed after a time-delay by the auxiliary finger 18D.

The centering finger 18A is therefore the first to engage the eyeglass frame 10 to center it correctly.

It is not until after this centering has been done that the auxiliary finger 18D in turn operates on the eyeglass frame 10 to orient it correctly, the inclined surface 36 of its orientation abutment member 52 causing the eyeglass frame 10 to rotate, if necessary, about its points of support on the opposed orientation abutment members 18D, 18C until, as for the orientation abutment members 18B, 18C, the eyeglass frame 10 is held against the retaining plate 38 of the orientation abutment member 52.

Finally, all the operator has to do is to operate the slider 31 to raise the flap 20 as far as is necessary for the righthand rim or surround 11 of the eyeglass frame 10 to be as flat as possible, parallel to the plane of the hole 19 in the plate 16.

Because of the centering done by the centering finger 18A the subsequent contour reading provides all the necessary dimensions and in particular the so-called "boxing dimensions" of the righthand rim or surround 11, that is to say the dimensions corresponding to the circumscribing rectangle of the lens to be trimmed to fit the frame.

The same process is followed through for the lefthand rim or surround 11' of the eyeglass frame 10.

If necessary, there is associated with each centering finger 18A, 18'A of the support device 15 a microswitch which changes state when a centering finger 18A, 18'A moves from its retracted position to its deployed position, for example.

It is therefore a very simple matter for the associated reading device to identify which centering finger 18A, 18'A is in the deployed position and therefore which rim or surround 11, 11' of the eyeglass frame 15 is being read.

In the foregoing description it has been assumed that the orientation abutment member 18C is fixed, like the orientation abutment members 18B, 18'B, which is actually so when it is operative.

Figure 12:
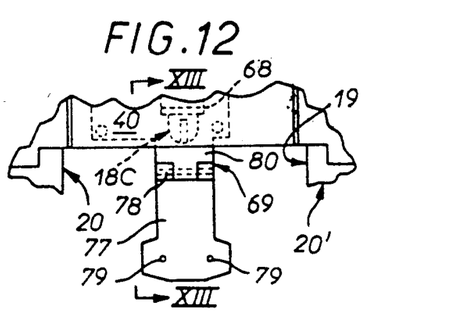
FIG. 12 repeats part of the plan view of FIG. 2 for the deployed position of the auxiliary support that the support device in accordance with the invention comprises.
Figure 13:
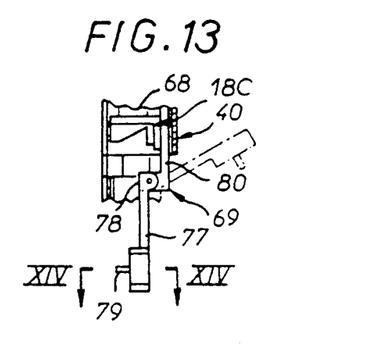
FIG. 13 is a view in cross-section on the line XIII—XIII in FIG. 12.
Figure 14:
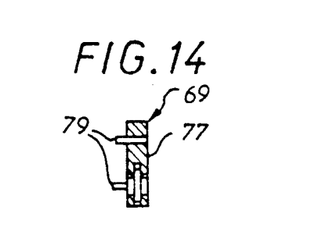
FIG. 14 is a view of the auxiliary support in cross-section on the line XIV—XIV in FIG. 13.

In the embodiment shown in FIGS. 1 through 14, however, the orientation abutment member 18C is in fact carried by a finger 68 sliding in the fixed casing 40 parallel to the pivot axes Z, Z' of the flaps 20, 20' between a retracted position in which, as shown in chain-dotted line in FIG. 12, the orientation abutment member 18C is away from the hole 19 in the plate 16 and a deployed position in which, as shown in full line in FIG. 2, the orientation abutment member 18C projects over the hole 19, as previously described.

The fixed casing 40 carries an auxiliary support 69 which is on the same side of the hole 19 in the plate 16 as the second orientation abutment member 18C. It is movable between a retracted position in which, as shown in chain-dotted line in FIG. 2, it is away from the hole 19 and a deployed position in which, as shown in full line in FIG. 12, it overlies the hole.

The orientation abutment member 18C and the auxiliary support 69 are controlled by common control means accessible to the operator such that one is in the retracted position when the other is in the deployed position and vice versa.

In the embodiment shown in FIGS. 1 through 14 the common control means comprise a shaft 70 perpendicular to the plane of the hole 19 in the plate 16. A knob 71 accessible to the operator is keyed to this shaft above the upper wall of the fixed casing 40. Keyed to this shaft below this wall are the auxiliary support 69 and a pinion 72 which meshes by way of a rack 73 with a carriage 74 of which the finger 68 carrying the orientation abutment member 18C forms part.

Snap-fastener means 76 stabilize both positions of the auxiliary support 69 and therefore the positions of the finger 68 carrying the orientation abutment member 18C.

The end part 77 of the auxiliary support 69 is articulated by a yoke 78 to the main part 80 of the auxiliary support 69; it can therefore be raised, to facilitate attaching a template, for example.

For this purpose the raisable end part 77 carries two spaced pegs 79 onto which the template whose contour is to be read is fitted.

So that the contour is read not by the head of the follower of the corresponding contour reading device but by the stem of this follower, the raisable end part 77 is offset relative to the main part 80 of the auxiliary support 69 which extends over the carriage 74 of which the finger 68 carrying the orientation abutment member 18C forms part.

All that the operator has to do is to operate the corresponding control knob 71 to select either the orientation abutment member 18C for reading the contour of an eyeglass frame rim or surround as previously described or the auxiliary support 69 for reading the contour of a template carried by the latter, for example.

As previously, a microswitch may be provided to signal the corresponding situation.

In the embodiment shown in FIGS. 15 through 18 the control means common to the auxiliary support 69 and the orientation abutment member 18C comprise, as previously, a shaft 70 carrying a knob 71. The auxiliary support 69 and the orientation abutment member 18C are both keyed to rotate with the shaft 70.

The auxiliary support 69 and the orientation abutment member 18C are in one piece, for example forming respective parts of a single member 81 constrained directly to rotate with the shaft 70, with no interposed peg.

The auxiliary support 69 and the orientation abutment member 18C are at substantially 90° to each other.

In this embodiment, the end part 77 of the auxiliary support 69 is detachable rather than raisable.

A mortice and tenon type joint is provided between it and the main part 80 that it extends, and it comprises two elastically deformable arms 82 embracing and snap-fastened to the latter.

Other features are as previously described.

Specifically, and as shown in full line, the end part 77 of the auxiliary support 69 comprises pegs 79 for attaching a template to it.

Figure 18:
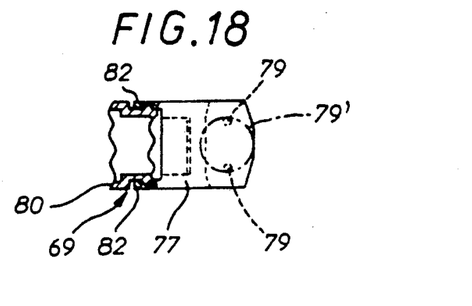
FIG. 18 is a partial view of it in cross-section on the line XVIII—XVIII in FIG. 16.

As an alternative to this, as represented in chain-dotted line in FIG. 18, it comprises a sucker 79' for attaching to it an already trimmed lens.

Figure 15:
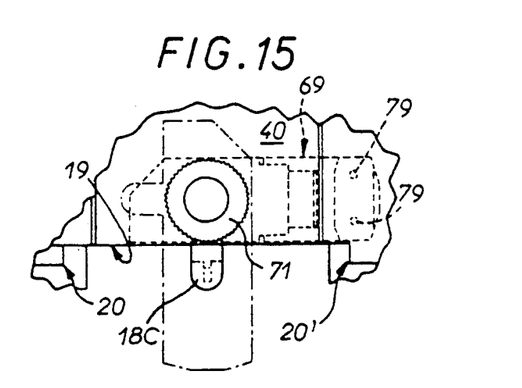
FIG. 15 is a partial plan view which, like FIG. 12, repeats part of FIG. 2, for an alternative embodiment of the auxiliary support, shown in its retracted position.
Figure 16:
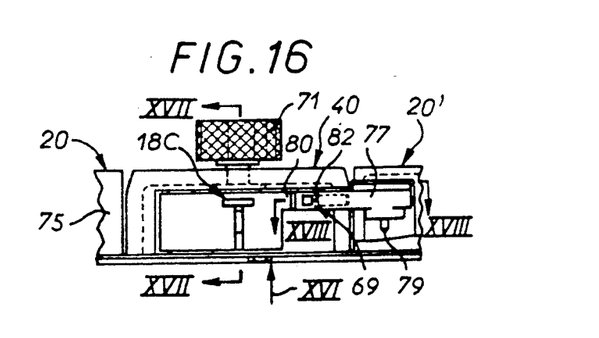
FIG. 16 is a partial view in elevation of this embodiment as seen in the direction of the arrow XVI in FIG. 15.
Figure 17:
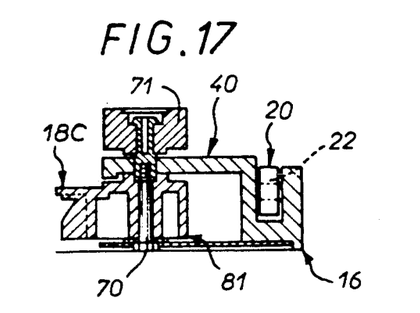
FIG. 17 is a partial view of it in transverse cross-section on the line XVII—XVII in FIG. 16.

In FIG. 15 the continuous lines correspond to the deployed position of the orientation abutment member 18C and therefore to the retracted position of the auxiliary support 69 while the chain-dotted lines correspond to the retracted position of the orientation abutment member 18C and therefore to the deployed position of the auxiliary support 69.

Of course, the present invention is not limited to the embodiments described and shown but encompasses any variant execution thereof and/or any variant combination of the various component parts.

In particular, if no auxiliary support is provided the orientation abutment member for which the auxiliary support can be substituted to read the contour of a template can be duplicated to provide two orientation abutment members, one per flap.

In this case the flaps carry all of the holding means provided on the support device.

We claim:

1. Support device in particular for eyeglass frames, comprising a plate, a hole in said plate, a flap pivoted to said plate and adjustable in terms of its inclination relative to said plate and a plurality of retaining means on said plate, said flap being adapted to hold an eyeglass frame above said hole, said plate comprising a frame and a slider moveable on one side of said frame parallel to the pivot access of said flap and on the side of said flap opposite said pivot axis, and cam means being operative between said slider and the corresponding edge of said flap to adjust the inclination of said flap.

2. Support device in particular for eyeglass frames, comprising a plate, a hole in said plate, a flap pivoted to said plate and adjustable in terms of its inclination relative to said plate and a plurality of retaining means on said plate, said flap being adapted to hold an eyeglass frame above said hole, said retaining means comprising a centering finger on one side of said hole in said plate, said centering finger being carried by said flap and slidable parallel to said pivot axis at a distance therefrom to operate in the plane of symmetry of the eyeglass frame between the two rims or surrounds thereof, and an orientation abutment member on the opposite side of said hole in said plate and carried by said flap, a second orientation abutment member on the same side of said hole in said plate as the first- mentioned orientation abutment member and in the immediate vicinity of said pivot axis of said flap, respective spring means adapted at all times to urge said centering and auxiliary fingers towards the opposite side of said hole in said plate, respective racks on said centering and auxiliary fingers, a pinion located between and meshing with both of said racks, a manually operable slide on which said pinion is freely rotatable and which is moveable parallel to said pivot axis of said flap between a retracted, standby position and a deployed, service position, and releasable snap-fastener means between said slide in said standby position and said flap, adapted selectively to retain said slide in said retracted, standby position, said spring means operative on said centering finger being stronger than said spring means operative on said auxiliary finger.

3. Support device in particular for eyeglass frames, comprising a plate, a hole in said plate, a flap pivoted to said plate and adjustable in terms of its inclination relative to said plate and a plurality of retaining means on said plate, said flap being adapted to hold the eyeglass frame above said hole, said retaining means comprising a centering finger on one side of said hole in said plate carried by said flap and slidable parallel to said pivot axis at a distance therefrom to operate, in the plane of symmetry of the eyeglass frame between the two rims or surrounds thereof, and an orientation abutment member on the opposite side of said hole in said plate and carried by said flap, a second orientation abutment member on the same side of said hole in said plate as the first-mentioned orientation abutment member and in the immediate vicinity of said pivot axis of said flap, two adjoining flaps being pivotable about parallel axes and an auxiliary support being moveable between a retracted position away from said hole in said plate and a deployed position overlying said hole, said second orientation abutment member being common to said two flaps, said auxiliary support being on the same side of said hole in said plate as said second orientation abutment member and moveable between a retracted position away from said hole in said plate and a deployed position in which it projects into said hole, and manually operable common control means for said auxiliary support and said second orientation abutment member operable such that when one of said auxiliary support and said second orientation abutment member is in said retracted position the other is in said deployed position and vice versa.

4. Support device according to claim 3 wherein said common control means comprise a shaft perpendicular to a general plane of said plate, a pinion constrained to rotate with said shaft, a rack meshing with said pinion and a finger carrying said second orientation abutment member coupled to said rack, said auxiliary support being constrained to rotate with said shaft.

5. Support device according to claim 3, wherein said common control means comprises a shaft perpendicular to the general plane of said plate with which said auxiliary support and said second orientation abutment member are constrained to rotate.

6. Eyeglass support device for use particularly in contour reading of eyeglass rims or surrounds, comprising a plate member, a readily accessible recess in said plate member for receiving an eyeglass frame front, a generally C-shaped pivotable flap member mounted on said plate member about a pivot axis and adjustable in inclination relative to said plate member, said flap member defining at least a portion of said recess, a wall portion of said flap member generally surrounding said recess but open adjacent the pivot axis, retaining means for releasably holding an eyeglass frame in said recess, whereby said flap member is adjustable to bring an eyeglass surround or rim of the eyeglass frame into position parallel to said plate member.

7. Support device according to claim 6, wherein said retaining means comprises a centering finger extending from one side of said wall portion which is slidable in a direction parallel to said pivot axis and spaced therefrom and engageable between two eyeglass frame rims or surrounds and an orientation abutment member extending from an opposite side of said wall portion for engagement with one of the eyeglass frame rims.

8. Support device according to claim 7, wherein said orientation abutment member is fixed.

9. Support device according to claim 7, wherein said orientation abutment member is transversely offset relative to said centering finger and is disposed remote from said pivot axis relative to said centering finger.

10. Support device according to claim 7 comprising a second orientation abutment member disposed on the same side of as said recess in said plate as the first-mentioned orientation abutment member, and said second orientation abutment member being located in the immediate vicinity of said pivot axis of said flap member.

11. Support device according to claim 7 comprising a second orientation abutment member disposed on the same side of as said recess in said plate as the first-mentioned orientation abutment member, and said second orientation abutment member being located in the immediate vicinity of said pivot axis of said flap member, and said orientation abutment members are substantially symmetrically disposed relative to said centering finger.

12. Support device according to claim 7 wherein said retaining means comprises on the same side of said recess as said centering finger an auxiliary finger slidable parallel to said centering finger and carrying at a free end thereof an orientation abutment member.

13. Support device according to claim 7, wherein said orientation abutment member has an inclined surface converging towards a corresponding side of said recess and diverging upwardly from said plate member, and a retaining plate above and substantially parallel to said plate member, said inclined surface being directed towards said retaining plate.

14. Support device according to claim 7 further comprising spring means constantly urging said centering finger towards the opposite side of said recess.

15. Support device according to claim 12 further comprising spring means constantly urging said centering finger towards the opposite side of said recess.

16. Support device according to claim 14 further comprising respective spring means adapted at all times to urge said centering and auxiliary fingers towards the opposite side of said recess, respective racks on said centering and auxiliary fingers, a pinion located between and meshing with both of said racks, a manually operable slide, said pinion being freely rotatable on said slide, said slide being moveable parallel to said pivot axis of said flap member between a retracted, standby position and a deployed, service position, and releasable snap fastener means between said slide and said flap member for selectively retaining said slide in said retracted, standby position, said spring means operative on said centering finger being stronger than said spring means operative on said auxiliary finger.

17. Support device according to claim 6 wherein two said flaps are provided adjoining each other and having parallel pivot axes.

18. Support device according to claim 6 further comprising an auxiliary support moveable between a retracted position set back from said recess and a deployed position overlying said recess.

19. Support device according to claim 18, wherein an end part of said auxiliary support is raisable.

20. Support device according to claim 18, wherein an end part of said auxiliary support is detachable.

21. Support device according to claim 18, wherein said auxiliary support comprises means for attaching a template thereto.

22. Support device according to claim 18 wherein said auxiliary support comprises means for attaching a lens thereto.

23. Eyeglass support device for use particularly in contour reading of eyeglass rims or surrounds, comprising a plate member, a readily accessible recess in said plate member for receiving an eyeglass frame front, a pair of generally C-shaped pivotable flap members mounted on said plate member in facing relationship, said flap members being pivotable about respective substantially parallel pivot axes and individually adjustable in inclination relative to said plate member, each of said flap members defining a portion of said recess, a wall portion of each of said flap members generally surrounding its corresponding recess portion, said recess portions opening on to each other, retaining means for releasably holding an eyeglass frame in said recess in either of two respective positions, whereby each of said flap members is adjustable to bring an eyeglass surround or rim of the eyeglass frame into position generally parallel to said plate member when the eyeglass frame is in the corresponding position is said recess.

24. Support device according to claim 23, wherein said pivot axes are relatively adjacent each other.

25. Support device according to claim 23, wherein said retaining means includes an orientation abutment member operable when an eyeglass frame is in each of said positions in said recess.

26. Support device according to claim 23, wherein said retaining means includes a pair of centering fingers generally disposed parallel to said pivot axes and cooperable with an eyeglass frame between the rims or surrounds, one of said centering fingers extending from one of said flap members in a first direction, and the other of said centering fingers extending from the other flap member in a direction generally opposite to the first.

* * * * *